Patented Apr. 5, 1938

2,113,305

UNITED STATES PATENT OFFICE 2,113,305

CELLULOSE MIXED ESTER COMPOSITIONS CONTAINING TOLUENE AND AN ALCOHOL

Carl J. Malm, Rochester, N. Y., and Charles L. Fletcher, Kingsport, Tenn., assignors, by mesne assignments, to Eastman Kodak Company, Jersey City, N. J., a corporation of New Jersey No Drawing. Application October 30, 1935, Serial No. 47,474

10 Claims. (Cl. 106—40)

This invention relates to compositions of matter in which cellulose mixed esters, such as cellulose acetate-propionate and cellulose acetate-butyrate, are combined or mixed with solvents or solvent mixtures, with or without a compatible plasticizer, and with or without other useful addition agents, and to products produced from such compositions. One object of this invention is to produce compositions of matter from which may be manufactured permanently transparent, strong and flexible sheets or films of desired thinness which are substantially waterproof, are unaffected by ordinary photographic fluids, and possess the desired properties of a support for sensitive photographic coatings. Another object of our invention is to produce compositions of matter which are capable of easy and convenient manipulation in the plastic and analogous arts, such as in the manufacture of wrapping sheets or tissue, films, artificial silk filaments, varnishes or lacquers, coating compositions and the like, and to produce compositions which will not injure, or be injured by, the substances or surfaces with which they are associated during manufacture. Other objects will become apparent to those skilled in the art to which this invention pertains.

The behavior of cellulose acetate-propionate and cellulose acetate-butyrate toward solvents is different from the behavior of cellulose acetate. Thus, it is well known that acetone is a solvent for hydrolyzed cellulose acetate, giving solutions from which sheets of moderate flexibility may be deposited, even without a plasticizer. Acetone is not a solvent for unhydrolyzed cellulose acetate. On the other hand, acetone is a solvent for both hydrolyzed and unhydrolyzed cellulose acetate-propionate and cellulose acetate-butyrate. Sheets of unhydrolyzed cellulose acetate-propionate or cellulose acetate-butyrate, however, deposited from solution in acetone, are brittle, and therefore of little use for any of the purposes to which cellulose ester sheets are ordinarily put, such, for instance, as photographic film support. Even the addition of a plasticizer to an acetone solution of unhydrolyzed cellulose acetate-propionate or cellulose acetate-butyrate does not impart good flexibility to sheets deposited therefrom.

Cellulose acetate is not soluble, in the cold, without assisting agents, in mixtures of toluene with methyl, ethyl, propyl or butyl alcohol. We have discovered that cellulose acetate-propionate and cellulose acetate-butyrate are soluble, even in the cold, in mixtures of toluene with methyl, ethyl, propyl or butyl alcohol, without the addition of any other solvent or assisting agent, and that the solutions so obtained give flexible films, even without a plasticizer. Certain of these compositions are referred to in our copending application Serial No. 551,546, Patent No. 2,026,583. We may use mixtures of toluene with methyl, ethyl, propyl or butyl alcohol in varying proportions: for instance, we may use equal parts of toluene and the alcohol, or we may use as much as four parts of toluene to one part of the alcohol, or as little as one part of toluene to four parts of the alcohol.

When we refer to cellulose acetate-propionate and cellulose acetate-butyrate, we mean the esters in which from two-thirds to all of the esterifiable hydroxyl groups in the cellulose are esterified, and in which the lower limit of propionyl or butyryl content is roughly in the neighborhood of 15% of the total weight of the ester.

Our toluene-alcohol mixtures are particularly advantageous solvents for the incorporation of natural or synthetic resins with cellulose acetate-propionate or cellulose acetate-butyrate, and hence are peculiarly suitable for the preparation of lacquers containing cellulose acetate-propionate or cellulose acetate-butyrate and resins. Some of the resins which we have found suitable for use in cellulose acetate-propionate or cellulose acetate-butyrate lacquers are ester gum, dammar, elemi, and colophony, as well as many of the synthetic resins. Plasticizers, such, for instance, as tricresyl phosphate, may be used in the lacquers. Other solvents and diluents may be present.

What we claim as our invention and desire to be secured by Letters Patent of the United States is:

1. A solution comprising a cellulose mixed organic acid ester selected from the group consisting of cellulose acetate-propionate and cellulose acetate-butyrate, in which the essential dissolving element for the cellulose organic acid ester is a mixture of toluene and an aliphatic, monohydric alcohol containing from one to four carbon atoms, the toluene and alcohol being present in such proportions to each other and the mixture being present in such an amount as to produce, upon evaporation of the solvent mixture, a transparent, flexible film.

2. A solution comprising a cellulose mixed organic acid ester selected from the group consisting of cellulose acetate-propionate and cellulose acetate-butyrate, and a compatible resin, in which the essential dissolving element for the cellulose organic acid ester and the resin is a mixture of toluene and methyl alcohol proportioned in the ratio of 1 to 16 parts of methyl alcohol per 4 parts of toluene, the mixture being present in such an amount as to produce, upon evaporation of the solvent mixture, a transparent, flexible film.

3. A solution comprising a cellulose mixed organic acid ester selected from the group consisting of cellulose acetate-propionate and cellulose acetate-butyrate, and a compatible resin, in which the essential dissolving element for the cellulose organic acid ester and the resin is a mixture of toluene and ethyl alcohol proportioned in the ratio of 1 to 16 parts of methyl alcohol per 4 parts of toluene, the mixture being present in such an amount as to produce, upon evaporation of the solvent mixture, a transparent, flexible film.

4. A solution comprising a cellulose mixed organic acid ester selected from the group consisting of cellulose acetate-propionate and cellulose acetate-butyrate, and ester gum, in which the essential dissolving element for the cellulose organic acid ester and the ester gum is a mixture of toluene and an aliphatic, monohydric alcohol containing from one to four carbon atoms, proportioned in the ratio of 1 to 16 parts of alcohol per 4 parts of toluene, the mixture being present in such an amount as to produce, upon evaporation of the solvent mixture, a transparent, flexible film.

5. A solution comprising a cellulose mixed organic acid ester selected from the group consisting of cellulose acetate-propionate and cellulose acetate-butyrate, and dammar resin, in which the essential dissolving element for the cellulose organic acid ester and the resin is a mixture of toluene and an aliphatic, monohydric alcohol containing from one to four carbon atoms, proportioned in the ratio of 1 to 16 parts of alcohol per 4 parts of toluene, the mixture being present in such an amount as to produce, upon evaporation of the solvent mixture, a transparent, flexible film.

6. A solution comprising a cellulose mixed organic acid ester selected from the group consisting of cellulose acetate-propionate and cellulose acetate-butyrate, and elemi resin, in which the essential dissolving element for the cellulose organic acid ester and the resin is a mixture of toluene and an aliphatic, monohydric alcohol containing from one to four carbon atoms, proportioned in the ratio of 1 to 16 parts of alcohol per 4 parts of toluene, the mixture being present in such an amount as to produce, upon evaporation of the solvent mixture, a transparent, flexible film.

7. A solution comprising a cellulose mixed organic acid ester selected from the group consisting of cellulose acetate-propionate and cellulose acetate-butyrate, in which the essential dissolving element for the cellulose organic acid ester is a mixture of toluene and methyl alcohol in the ratio of 1 to 16 parts of methyl alcohol per 4 parts of toluene, the mixture being present in an amount to produce, upon evaporation of the solvent mixture, a transparent, flexible film.

8. A solution comprising a cellulose mixed organic acid ester selected from the group consisting of cellulose acetate-propionate and cellulose acetate-butyrate, in which the essential dissolving element for the cellulose organic acid ester is a mixture of toluene and ethyl alcohol in the ratio of 1 to 16 parts of ethyl alcohol per 4 parts of toluene, the mixture being present in an amount to produce, upon evaporation of the solvent mixture, a transparent, flexible film.

9. A solution comprising a cellulose mixed organic acid ester selected from the group consisting of cellulose acetate-propionate and cellulose acetate-butyrate, and a compatible resin, in which the essential dissolving element for the cellulose organic acid ester and the resin is a mixture of toluene and an aliphatic, monohydric alcohol containing from one to four carbon atoms, the toluene and alcohol being present in such proportions to each other and the mixture being present in such an amount as to produce, upon evaporation of the solvent mixture, a transparent, flexible film.

10. A solution comprising a cellulose mixed organic acid ester selected from the group consisting of cellulose acetate-propionate and cellulose acetate-butyrate, and a compatible resin, in which the essential dissolving element for the cellulose organic acid ester and the resin is a mixture of toluene and an aliphatic monohydric alcohol containing from one to four carbon atoms, in the ratio of 1 to 16 parts of alcohol per 4 parts of toluene, the mixture being present in such an amount as to produce, upon evaporation of the solvent mixture, a transparent, flexible film.

CARL J. MALM.
CHARLES L. FLETCHER.